United States Patent
Tryding

[11] Patent Number: 5,880,732
[45] Date of Patent: Mar. 9, 1999

[54] APPARATUS ENABLING USAGE OF EXTERNAL DISPLAY MONITOR WITH A MOBILE TELEPHONE

[75] Inventor: Sven Tryding, Lund, Sweden

[73] Assignee: Telefonaktiebolaget L M Ericsson publ., Stockholm, Sweden

[21] Appl. No.: 845,937

[22] Filed: Apr. 29, 1997

[51] Int. Cl.$^6$ .................................................. G06F 3/00
[52] U.S. Cl. ........................................ 345/352; 455/5.1
[58] Field of Search ................... 379/21, 93.23, 379/90.01; 455/5.1, 403, 550, 73; 345/352

[56] References Cited

U.S. PATENT DOCUMENTS

| | | | |
|---|---|---|---|
| 5,048,077 | 9/1991 | Wells et al. | 379/39.17 |
| 5,138,649 | 8/1992 | Kirsbergh et al. | 455/420 |
| 5,191,602 | 3/1993 | Regen et al. | 74/571 R |
| 5,239,700 | 8/1993 | Guenther et al. | 455/158.4 |
| 5,334,824 | 8/1994 | Martinez | 705/41 |
| 5,375,604 | 12/1994 | Kelly et al. | 600/484 |
| 5,509,048 | 4/1996 | Meidan et al. | 455/564 |
| 5,550,754 | 8/1996 | McNelley et al. | 348/14 |
| 5,566,224 | 10/1996 | Ul Azam et al. | 455/566 |
| 5,584,054 | 12/1996 | Tyneski et al. | 455/566 |

FOREIGN PATENT DOCUMENTS

| | | |
|---|---|---|
| 0 333 330 A1 | 2/1989 | European Pat. Off. . |
| 0426966 | 5/1991 | European Pat. Off. . |
| 0731590 | 9/1996 | European Pat. Off. . |
| 0766438 | 4/1997 | European Pat. Off. . |
| 9008431 | 7/1990 | WIPO . |
| 2264613 | 4/1992 | WIPO . |
| 9503664 | 2/1995 | WIPO . |

OTHER PUBLICATIONS

Morris, E., "Lan evolution's third phone: remote, mobile users," Communications News, v.31, N2, p. 57(1), 1994.

Primary Examiner—A. Katbab
Attorney, Agent, or Firm—Jenkens & Gilchrist, P.C.

[57] ABSTRACT

A method and apparatus enabling the usage of a remote display monitor for presenting display data from a mobile telephone is disclosed. A mobile telephone includes a display monitor communication function enabling the generation of a communications link between the mobile telephone and a receiver of a display monitor. The communications link enables the transmission of numeric and textual data intended to be displayed on a display associated with a mobile telephone on the larger screen of the remote display monitor. The type of data presented on the display monitor may be selectively programmed by a user.

20 Claims, 4 Drawing Sheets

APPARATUS ENABLING USAGE OF EXTERNAL DISPLAY MONITOR WITH A MOBILE TELEPHONE

BACKGROUND OF THE INVENTION

1. Technical Field of the Invention

The present invention relates to user interfaces for mobile telephones, and more particularly, to the display of data associated with the mobile telephone display on an external electronic display.

2. Description of Related Art

The continued development of mobile telephone technologies, such as PCS, SMS and USSP Message Services have increased the use of graphical displays to present information to a mobile telephone user. When using these types of technologies, display data is transmitted to a mobile telephone from a base transceiver station. The display data actuates functionalities within the mobile telephone to drive a display on the mobile telephone. The display provides a visual presentation to the user of the transmitted information.

However, the small size of mobile telephones necessarily causes an associated display to be rather small. The use of a small display requires the use of small font characters or abbreviations in order to fully present visual information to the user of the cellular telephone. This makes the displayed data difficult to read or interpret. Unfortunately, the present direction of development of mobile telephones is producing smaller and smaller hand-held units. Thus, there is no way to increase the display size and readability associated therewith while still meeting the public's desire for smaller mobile telephones. Thus, there exist a need for presenting a user with a more easily readable visual display that is associated with a mobile telephone.

SUMMARY OF THE INVENTION

The present invention overcomes the foregoing and other problems with an apparatus enabling the usage of an external display monitor for the presentation of mobile telephone display information. A display monitor, such as a television set or a computer monitor, includes a receiving unit for receiving display signals from a mobile telephone. The receiver may operate according to an infrared or RF protocol. Additionally, a transmitting unit may be included with the display monitor to enable two-way communications between the display monitor and the mobile telephone.

A communications function within the mobile telephone enables the generation of a communications link between the receiving unit at the display monitor and the mobile telephone. Through the communications link, display signals from the mobile telephone are transmitted for display upon the screen of the display monitor. The communication function may further include a manual activation function for manually activating the communications link between the mobile telephone and the display monitor or may alternatively include an automatic activation function enabling the communications link to be automatically generated between the display monitor and the mobile telephone.

The monitoring communications function will further include means enabling the selection of the type of data to be transmitted from the mobile telephone for display on the display monitor, for example, SMS messages, all text, or incoming call data. Once the communications link has been established between the mobile telephone and the display monitor and the type of data to be displayed programmed, all displayed data is transmitted from the mobile telephone to the display monitor such that the user may easily read the textual display off the display monitor screen.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
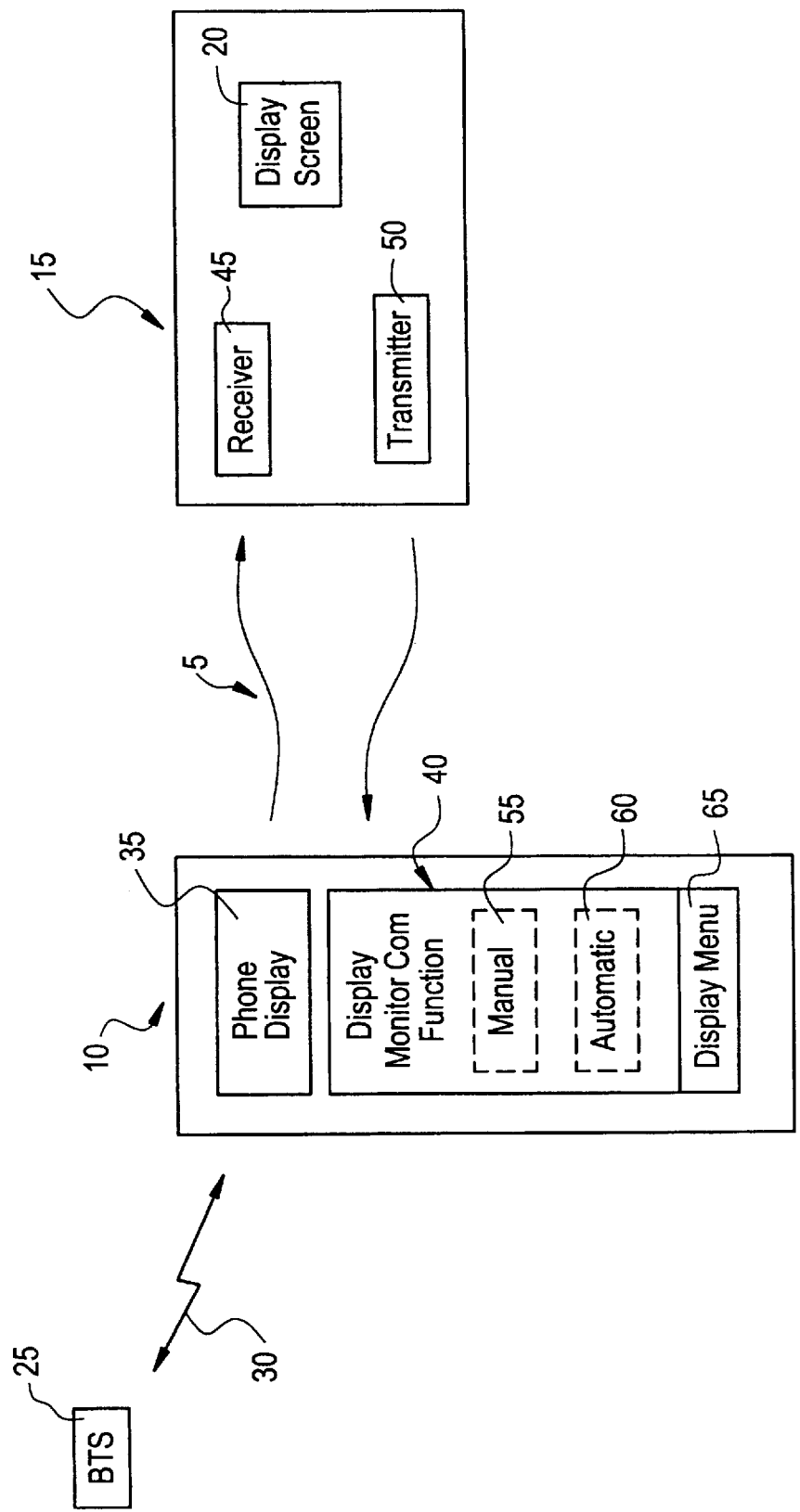
FIG. 1 is a block diagram of the apparatus enabling usage of an external display area for displaying mobile telephone information.

Referring now to the drawings, and more particularly to FIG. 1, there is illustrated the apparatus for generating a communications link 5 between a mobile telephone 10 and display monitor 15 to enable the display of mobile telephone data on the display screen 20 of the display monitor 15. A base transceiver station 25 will transmit a variety of data and messages to the mobile telephone 10 through a downlink 30. This information may include alphanumeric data for display upon the phone display 35 of the mobile telephone 10. Unfortunately, due to the small size of the mobile telephone 10, the display 35 presents the data at a size that may make it difficult for the average user to easily view.

The mobile telephone 10 includes a display monitor communications function 40 enabling the generation of the communications link 5 with the monitor 15. The communications link 5 between the mobile telephone 10 and display monitor 15 is through a receiver 45 associated with the display monitor 15. In one embodiment, the display monitor 15 need only include the receiver 45. However, in an alternative embodiment, the display monitor 15 may further include a transmitter 50 enabling data transmission from the display monitor 15 back to the monitor communications function 40 of the mobile telephone 10 through the communications link 5. The transmitter 50 and receiver 45 may also be combined into a single transceiver unit.

The communications link 5 generated between the mobile telephone 10 and display monitor 15 preferably comprises an infrared (IR) communications link due to the fact that many presently existing television sets already include means for receiving IR signals from devices such as a remote control. However, other means of generating a communications link, such as RF communications may also be used, so long as the link 5 may be generated between the mobile telephone 10 and display monitor 15 in one or both directions.

The monitor communications function 40 further includes a manual activation function 55 or an automatic activation function 60 to enable creation of the communications link 5. The manual activation function 55 generates a communications link 5 with the display monitor 15 in response to user inputs from the mobile telephone 10. The automatic activation function 60 enables the communications link to be automatically generated between the mobile telephone 10 and the display monitor 15.

The low layer data transfer protocol associated with the manual activation function 55 requires user activity in order to resend unreadable/distributed data. However, a simple data link protocol using seven data bits and one stop bit would be sufficient for normal indoor operating environments where the invention would be utilized. In the case of the automatic activation function 60, a package utilizing CRCs (check sums) and parity bits would prevent unreadable data from being displayed. The display monitor communications function 40 would provide the physical parameters, bit rates and emitting levels necessary to generate the communications link with standard television set parameters.

Figure 2:
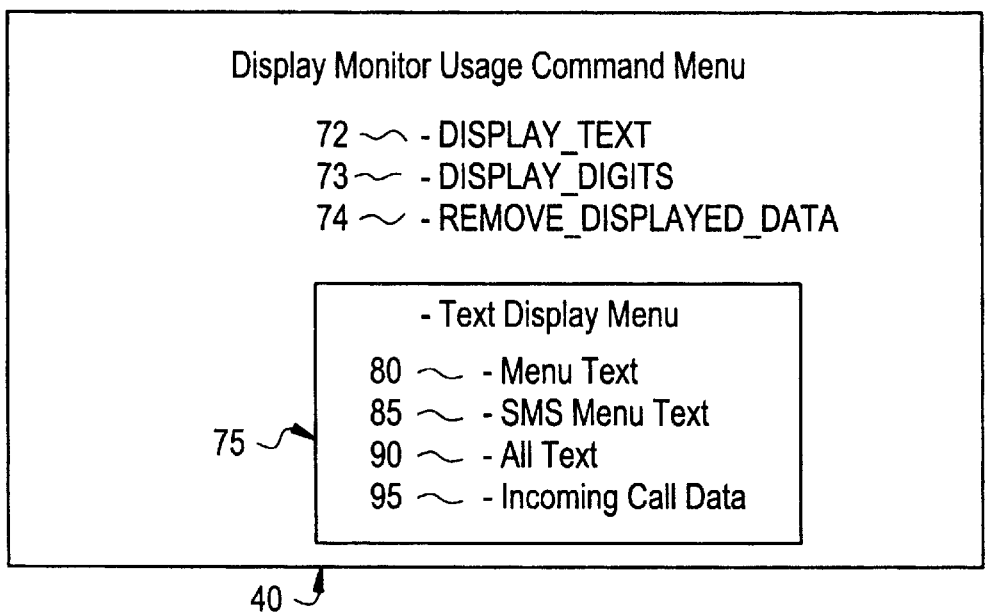
FIG. 2 is an illustration of the menu selections enabling activation of a communications link and programming of the data displayed.

Referring now also to FIG. 2, there is illustrated the display monitor usage command menu 65 available to a user of the mobile telephone 10 enabling a display of mobile telephone information on the display screen 20 of display monitor 15. The display monitor usage command menu 65 initializes activation of the communications link 5 using either a manual activation function 55 or automatic activation function 60. Once the communications link 5 is established, the text display menu 75 enables selection of the various types of text or information which a user desires to have displayed upon the display screen 20 of display monitor 15. Examples of this include all menu text 80, SMS menu text 85, all text 90, and incoming call data 95. In this manner, a user may selectively program the type of data which is going to be displayed upon the display monitor rather than having all types of display data presented.

The display monitor usage command menu 65 includes a number of commands, such as DISPLAY_TEXT 72 for displaying text information, DISPLAY_DIGITS 73 for displaying digits and numeric data, and REMOVE_DISPLAYED_DATA 74 for clearing a text message from the display monitor. Each of these commands would be of a specified length and have associated parameters indicating the length of a possible text message, the coding of the message, priority of the message, and a clear condition for the message.

Additionally, if the display monitor 15 includes a transmitter for responding to commands of the display monitor communication function 40, each command transmitted from the mobile telephone 10 would have an associated confirmation command indicating that the message had been received. Thus, in accordance with the previously given examples, the following confirmation commands would exist; DISPLAY_TEXT_CNF, DISPLAY_DIGITS_CNF, and REMOVE_DISPLAYED_DATA_CNF.

Figure 3:
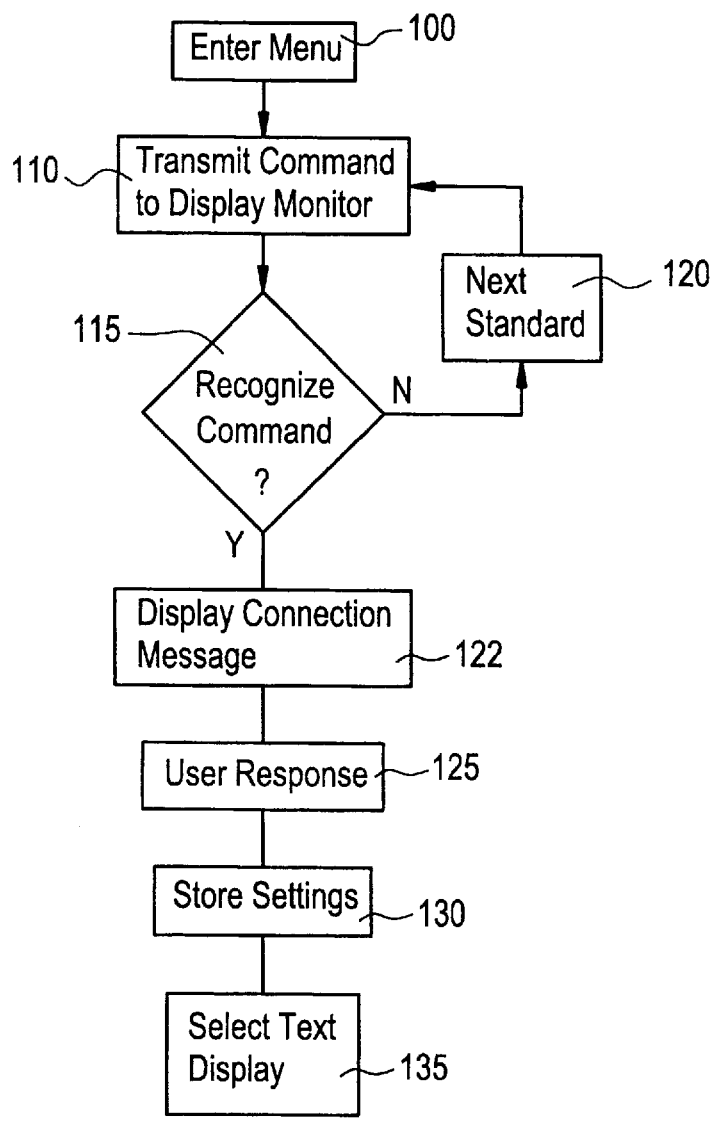
FIG. 3 is a flow diagram illustrating the manual connection of a communication link between a mobile telephone and a display monitor.

FIG. 3 is a flow diagram illustrating the method by which the manual activation function 55 would open the communications link 5 between the mobile telephone 10 and display monitor 15 and enable display of selected types of display data upon the display screen 20. At step 100, the user enters the display monitor usage command menu 65. Upon entry into the display monitor usage command menu 65, the user may further select the DISPLAY_TEXT command 72 which activates the manual activation function 55 and is transmitted to the display monitor 15 at step 110 according to a first communications standard for a first type of television/computer monitor. The monitor communications function 40 waits for an indication at inquiry step 115 that the receiver 45 of the display monitor 15 has received and recognized the display text command. If the display monitor 15 does not recognize the initially transmitted communications standard, a next standard is accessed at step 120 and control returns back to step 110 to retransmit the DISPLAY_TEXT command 72 using the new standard. This is necessary due to the number of different types of television and/or computer display monitors that exist and respond to different types of signaling protocols.

Once the display monitor 15 recognizes the DISPLAY_TEXT command 72 at step 115, the display monitor 15 displays a textual message indicating that the connection has been made at step 122, and a user responds to message at step 125 by pressing a "yes" button or similar type of indication. The display monitor communications function 40 then stores at step 130 the present communication settings to enable transfer of display data over the communications link 5. The user may then select at step 135 the various types of text to be displayed upon the display screen 20 using the text display menu 75.

Figure 4:
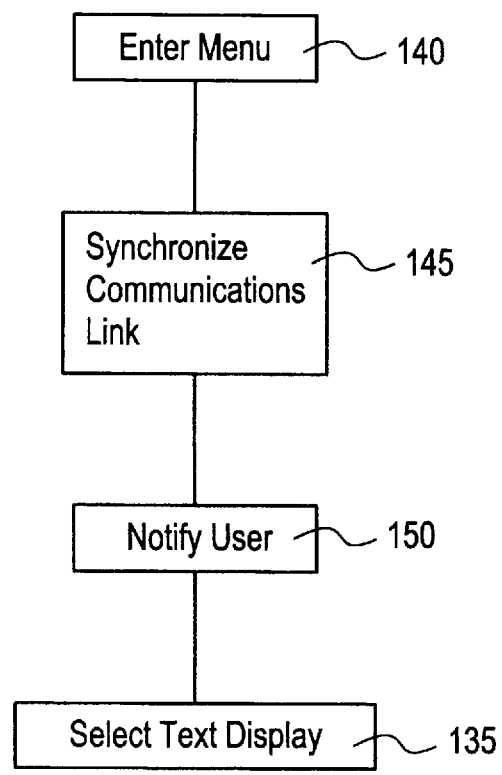
FIG. 4 is a flow diagram illustrating the automatic connection of a communications link between a mobile telephone and a display monitor.

Referring now to FIG. 4, there is illustrated a flow diagram describing the procedure to form the communications link between the mobile telephone 10 and monitor 15 using the automatic activation function 60. Initially, the user enters the display monitor usage command menu 65 at step 140. Entry into this menu causes the automatic activation function 60 to automatically synchronize the communications link 5 with the display monitor 15 at step 145 without requiring any additional user input. Once the communications link 5 has been established and synchronized, the user is notified of this at step 150 on the display screen 20 of the display monitor 15. The user may then make text display menu 75 selections at step 155 to establish the particular text or data to be displayed upon the display screen 20.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A system for displaying on a remote display monitor display signals from a mobile telephone, comprising:

a receiver connected with the remote display monitor for receiving the display signals to be displayed by the remote display monitor; and a transmitter associated with the remote display monitor for transmitting data to the mobile telephone;

a monitor communications function connected with the mobile telephone for generating a communications link with the receiver to enable the display signals from the mobile telephone to be transmitted to and displayed by the display monitor, said monitor communications function further responsive to transmitted data from the display monitor.

2. The system of claim 1 wherein the monitor communications function includes means for automatically actuating the communications link in response to detection of the receiver.

3. The system of claim 1 wherein the monitor communications function further includes means responsive to a user input for actuating the communications link with the receiver.

4. The system of claim 1 wherein the communications link comprises an IR communications link.

5. The system of claim 1 wherein the communications link comprises an RF communications link.

6. The system of claim 1 wherein the remote display monitor comprises a television.

7. The system of claim 1 wherein the remote display monitor comprises a computer display.

8. The system of claim 1 further including command menu means for providing a display to the user of a plurality commands associated with the display monitor and for enabling selective programming of, in response to user inputs, the display of data transmitted to the remote display monitor from the mobile telephone.

9. A system for displaying on a remote display monitor display data from a mobile telephone, comprising:

a receiver connected with the remote display monitor for receiving the display signals to be displayed by the remote display monitor;

a monitor communications associated with the mobile telephone for generating a communications link with the receiver to enable the display signals from the mobile telephone to be transmitted to and displayed by the remote display monitor; and command menu means for providing a display to the user of a plurality commands associated with the remote display monitor and for enabling selective programming of, in response to user inputs, the display of data transmitted to the remote display monitor from the mobile telephone.

10. The system of claim 9 wherein the communications link comprises an IR communications link.

11. The system of claim 9 wherein the communications link comprises an RF communications link.

12. The system of claim 9 wherein the remote display monitor comprises a television.

13. The system of claim 9 wherein the remote display monitor comprises a computer display.

14. The system of claim 9 further including a transmitter for transmitting signals from the remote display monitor to the mobile telephone.

15. A method for displaying data from a mobile telephone on a remote display monitor, comprising the steps of:

receiving display data for display on the display of a mobile telephone at the mobile telephone;

forming a communications link between the mobile telephone and the remote display monitor;

transmitting the display data from the mobile telephone to the remote display monitor through the communications link;

entering at the mobile telephone a command for controlling display of the display data on the remote display monitor;

confirming receipt of the command from the remote display monitor to the mobile telephone; and displaying the display data from the mobile telephone on the remote display monitor according to the command.

16. The method of claim 15 wherein the step of forming further includes the step of generating the communications link in response to a user generated input from the mobile telephone.

17. The method of claim 15 wherein the step of forming further includes the steps of:

scanning by the mobile telephone for a presence of a receiver associated with the display monitor;

forming the communications link upon detection of a presence of the receiver.

18. The method of claim 15 wherein the step of forming further comprises the step of forming an RF communications link.

19. The method of claim 15 wherein the step of forming further comprises the step of forming an IR communications link.

20. The method of claim 16 further including the step of transmitting a confirmation of formation of the communications link from the display monitor to the mobile telephone.

* * * * *